(12) United States Patent
Boutaghou et al.

(10) Patent No.: US 6,233,118 B1
(45) Date of Patent: May 15, 2001

(54) SYSTEM FOR CAPTURING WEAR DEBRIS IN A DATA STORAGE SYSTEM

(76) Inventors: Zine-Eddine Boutaghou, 307 Lily Pond La., Vadnais Heights, MN (US) 55127; Aric Kumaran Menon, 8157 Telegraph Rd., Bloomington, MN (US) 55438

( * ) Notice: Subject to any disclaimer, the term of this patent is extended or adjusted under 35 U.S.C. 154(b) by 0 days.

(21) Appl. No.: 09/130,414

(22) Filed: Aug. 6, 1998

Related U.S. Application Data

(60) Provisional application No. 60/069,310, filed on Dec. 4, 1997.

(51) Int. Cl.[7] ........................................... G11B 5/60
(52) U.S. Cl. ...................... 360/235.4; 360/236.6; 360/237
(58) Field of Search ............................ 360/103, 235.4, 360/237.1

(56) References Cited

U.S. PATENT DOCUMENTS

| | | | | |
|---|---|---|---|---|
| 4,212,044 | * | 7/1980 | Plotto | 360/103 |
| 5,079,657 | | 1/1992 | Aronoff et al. | 360/103 |
| 5,490,025 | * | 2/1996 | Dorius | 360/103 |
| 5,751,517 | | 5/1998 | Agarwal | 360/103 |
| 5,831,792 | * | 11/1998 | Ananth | 360/103 |
| 5,926,343 | * | 7/1999 | Dorius | 360/103 |
| 5,926,344 | * | 7/1999 | Kimura | 360/103 |

\* cited by examiner

*Primary Examiner*—A. J. Heinz

(57) ABSTRACT

A data storage system including a head supporting transducer elements relative to a disc surface for proximity recording. The head including a slider having debris collection cavities positioned relative to a contact interface between the slider and disc surface. The debris collection cavities being designed to collect debris loosed from the disc surface to reduce thermal asperities.

19 Claims, 8 Drawing Sheets

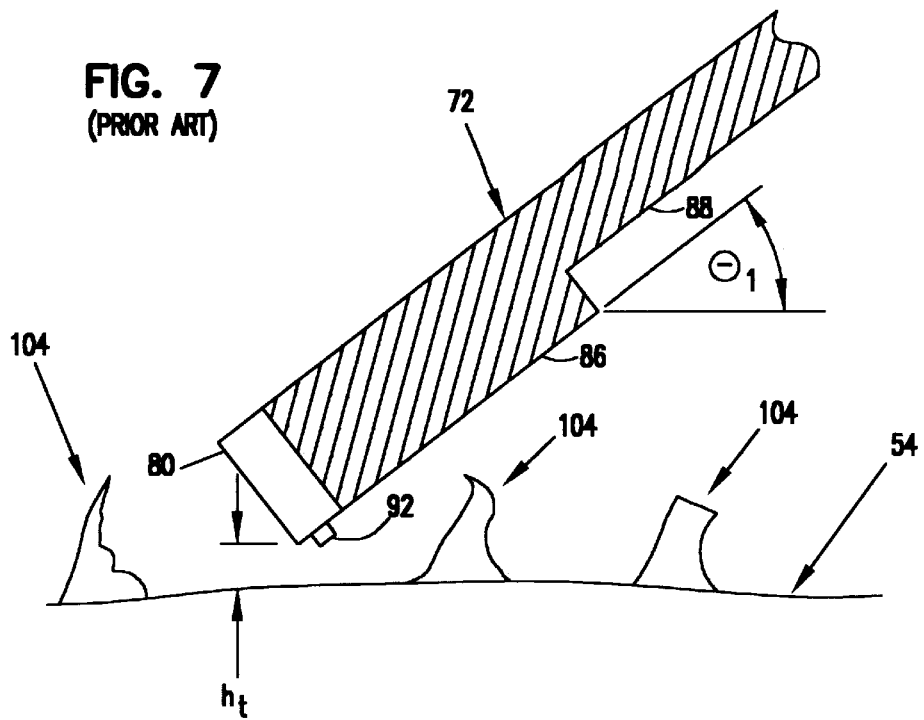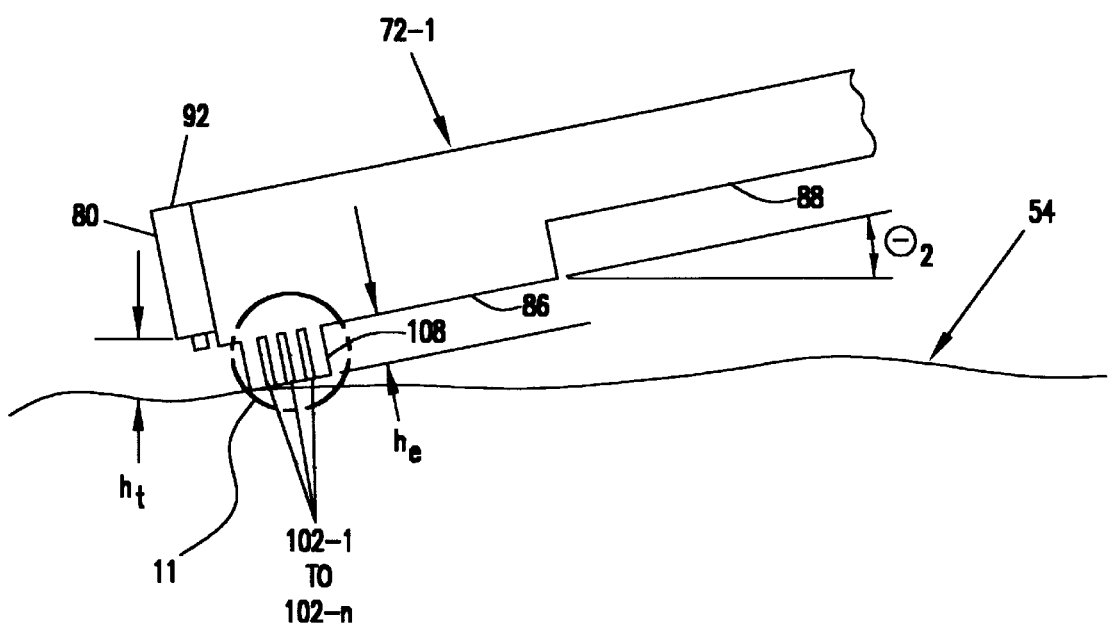

SYSTEM FOR CAPTURING WEAR DEBRIS IN A DATA STORAGE SYSTEM

CROSS-REFERENCE TO RELATED APPLICATION

The present application claims priority to U.S. Provisional Application Ser. No. 60/069,310, entitled "METHOD TO CAPTURE WEAR DEBRIS DURING CONTACT RECORDING," filed Dec. 4, 1997.

BACKGROUND OF THE INVENTION

The present invention relates to data storage systems. In particular, the present invention relates to a slider design for supporting transducers for reading and writing information to a data disc.

Data storage systems are known which include transducers supported relative to a disc surface for reading and writing information. Known transducer elements include inductor-type transducers and magnetoresistive ("MR") transducer elements. The transducers are supported via a slider having a bearing surface for supporting the transducers above the disc surface for proximity recording. As the disc spins, air flows under the bearing surface to raise the slider (and transducer elements) relative to the disc surface to fly over the disc surface for read and write operations.

It is important for operation that the slider fly in close proximity to the disc surface to provide desired read and write resolution. During operation of the disc drive, the slider intermittently contacts the disc media. Contact between the disc surface and a MR head may cause thermal asperities. In particular, contact between the head and disc surface may heat the MR elements causing a large spike in the output of the MR element, which disrupts its ability to read data from the disc surface. A relatively smooth disc or media surface is used for MR proximity recording to reduce thermal asperities. Contact of the slider with the disc surface may wear the disc surface, causing debris to be removed or spattered from the disc surface. Wear debris loosened from a relatively smooth surface collects since there are no collection sites as provided by a textured disc surface and piles on the smooth surface which may cause thermal asperities, which may corrupt data written to the disc surface.

SUMMARY OF THE INVENTION

The present invention relates to a system and apparatus for reducing the propensity for floating debris to collect or congregate in piles, creating thermal asperities which may corrupt the disc surface. The system includes debris collection cavities on the slider supporting transducer elements. The debris collection cavities are located at a contact interface between the slider and disc surface. The system of the present invention has particular application for operation with magnetoresistive heads adapted to read data from a "super smooth" disc surface, although application of the present invention is not limited to magnetoresistive heads.

BRIEF DESCRIPTION OF THE DRAWINGS

FIG. 7 is a cross-sectional view of a portion of a prior art slider supported at a pitch angle relative to the disc surface.

FIG. 9 is a cross-sectional view of the slider of FIG. 8 contacting the disc surface via a contact extension.

It should be noted that the foregoing drawings are included for illustration purposes and are not necessarily drawn to scale. Some details of the drawings may be exaggerated for clarity.

DETAILED DESCRIPTION OF THE PREFERRED EMBODIMENTS

Figure 1:
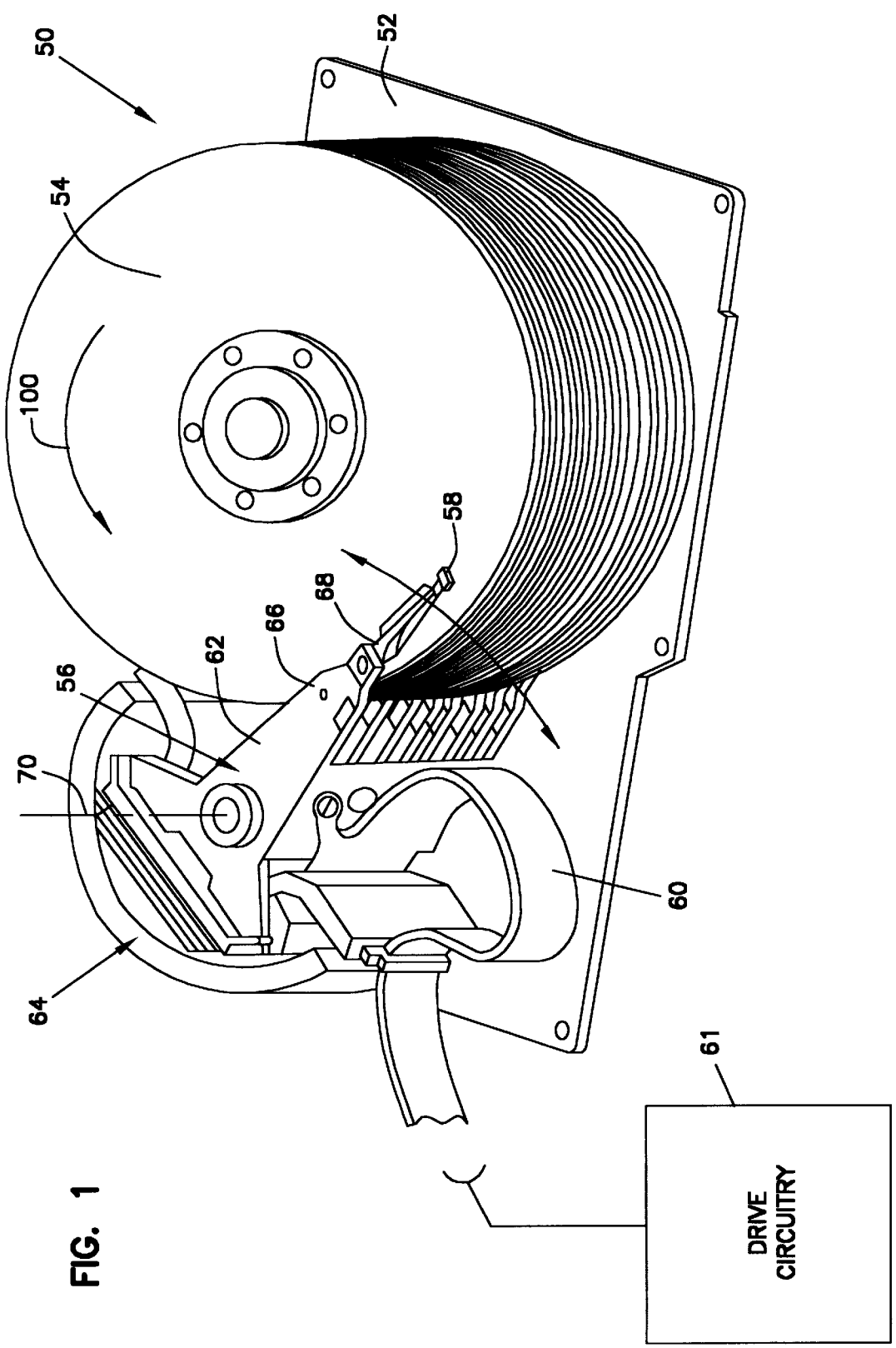
FIG. 1 is a perspective illustration of a disc drive.

The present invention relates to a data storage system and, in particular, has applications to a disc drive 50 for storing digital information as shown in FIG. 1. As shown, disc drive 50 includes a base 52; a disc stack 54; and rotary actuator 56, which supports heads 58 relative to surfaces of discs of disc stack 54 to read and write information to and from the disc. Heads 58 are coupled to a flex circuit 60, which is coupled to circuitry 61 of the disc drive for read and write operations.

Figure 2:
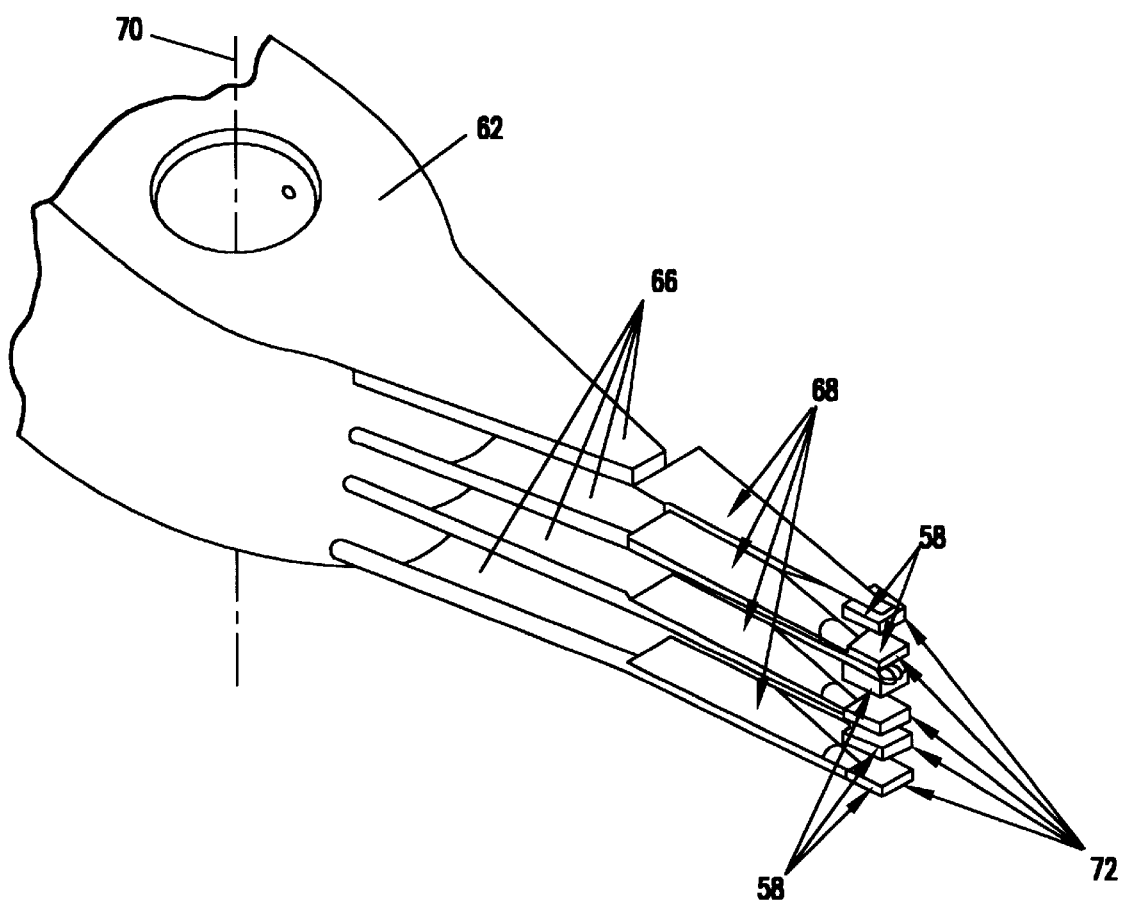
FIG. 2 is a perspective view of an actuator block supporting heads for read/write operations.
Figure 3:
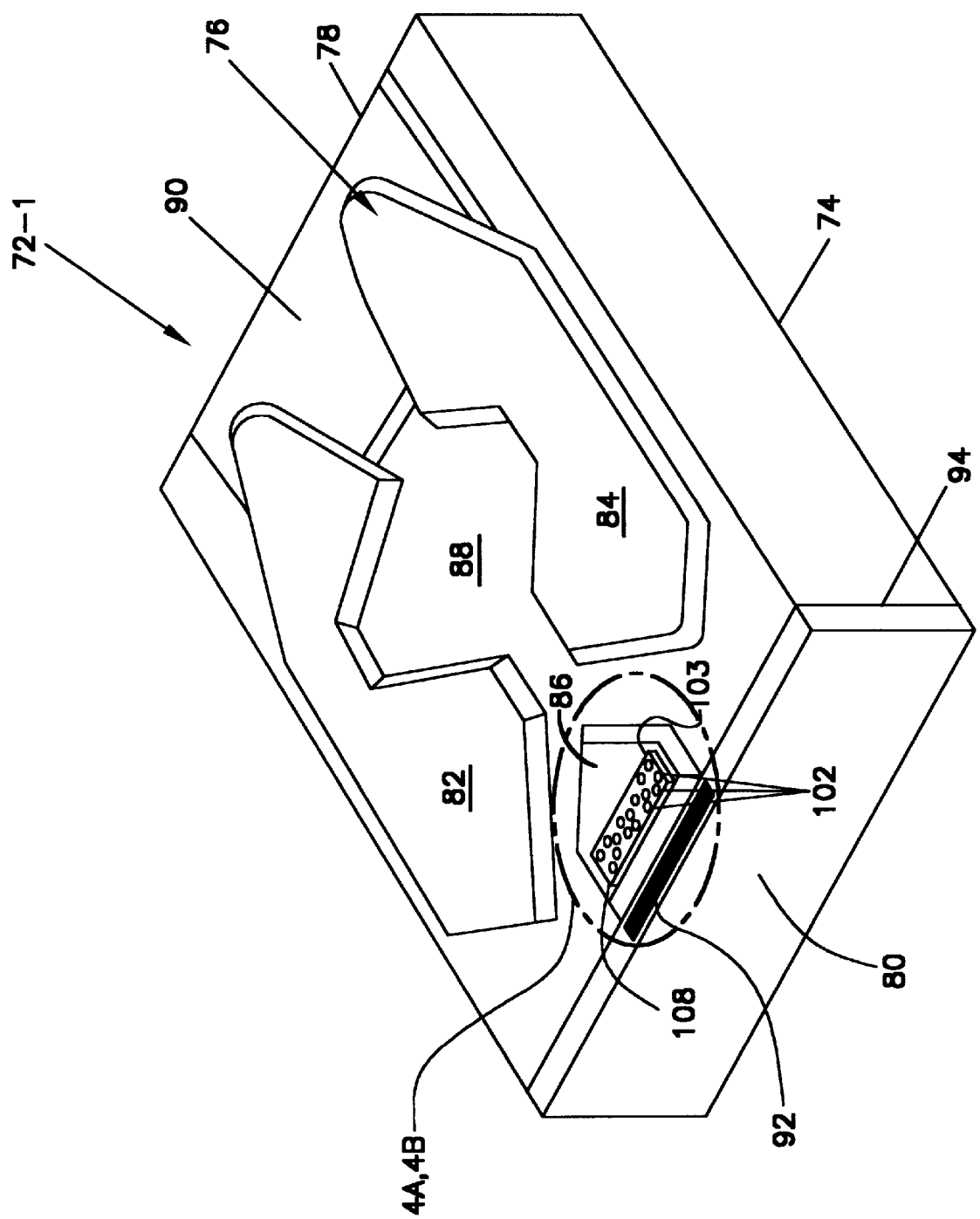
FIG. 3 is a perspective view of an embodiment of a slider incorporating debris cavities according to the present invention.

In particular, the rotary actuator 56 includes an actuator block 62 and a voice coil motor 64 for movement. Heads 58 are supported relative to the actuator block 62 via a plurality of stacked actuator arms 66. The heads 58 are coupled to the actuator arms 66 via suspension assemblies 68 in a known manner. Operation of the disc drive rotates the actuator block 62 about an axis 70 for positioning heads 58 relative to selected data tracks on the disc surface via operation of the voice coil motor 64. FIG. 2 is a detailed perspective view of the actuator block 62, which illustrates heads 58 supported via suspension assemblies 68 coupled to actuator arms 66. As shown, heads 58 include a slider 72, which supports transducer elements for read and write operations.

FIGS. 3–6 illustrate an embodiment of a slider 72-1 including an upper surface 74, an air bearing 76, a leading edge 78, and a trailing edge 80. As shown, bearing 76 includes raised side rails 82, 84, and center rail 86 forming the bearing surface of the bearing 76. Raised side rails 82, 84 and center rail 86 are elevated above a recessed bearing cavity or base 88. The bearing 76 also includes a stepped surface 90 at a leading edge 78 for providing lift for the slider 72-1 for pressurization during "take off". The slider is formed of a ceramic substrate material, such as a mixture of TiC (Titanium Carbide) and Alumina ($Al_2O_3$), or other known slider materials. The bearing surfaces (side rails 82, 84; center rail 86; and surface 90) are formed by known subtractive masking techniques such as milling or chemical etching.

Transducers 92 (illustrated diagrammatically) are supported proximate to the trailing edge 80 of the slider for operation. Transducers may be inductive-type transducers or magnetoresistive-type ("MR") transducers. Transducers are embedded in an Alumina layer which is deposited on the trailing edge 80 of the slider via known deposit techniques.

Slider 72-1 is coupled to suspension assembly 68 at upper surface 74 of the slider so that air bearing 76 faces the disc surface. As the disc rotates, the disc pulls a very thin layer of air beneath the air bearing surface, which develops a lifting force that causes the slider 72-1 to lift and fly several microinches above the disc surface. In particular, air shearing from the air bearing surfaces causes air pressure to develop between the disc and the air bearing surfaces to provide lift to the slider to raise the slider to fly above the disc surface for proximity recording. The disc rotates as illustrated by arrow 100 of FIG. 1 to cause air to flow from leading edge 78 to trailing edge 80 for flying operations of heads 58.

Figure 4A:
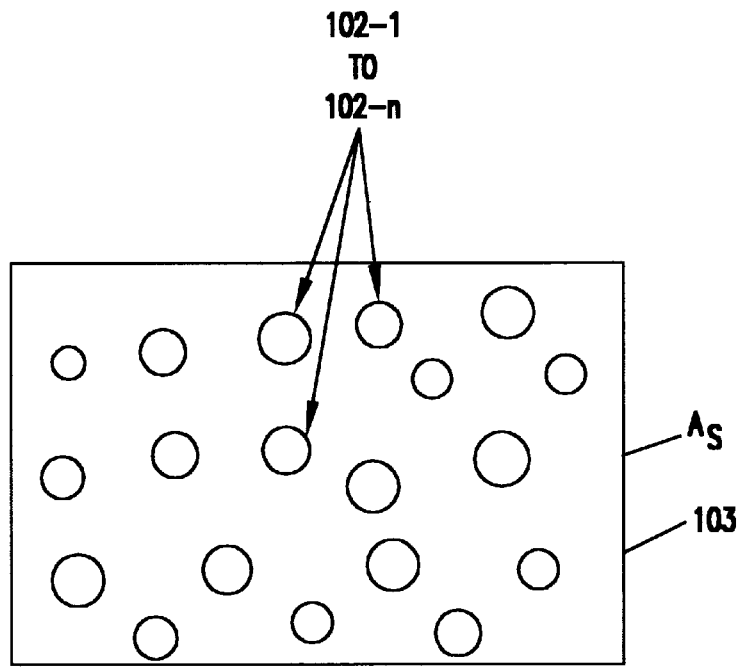
FIG. 4A is a detailed view of one embodiment of a portion 4 in FIG. 3.
Figure 4B:
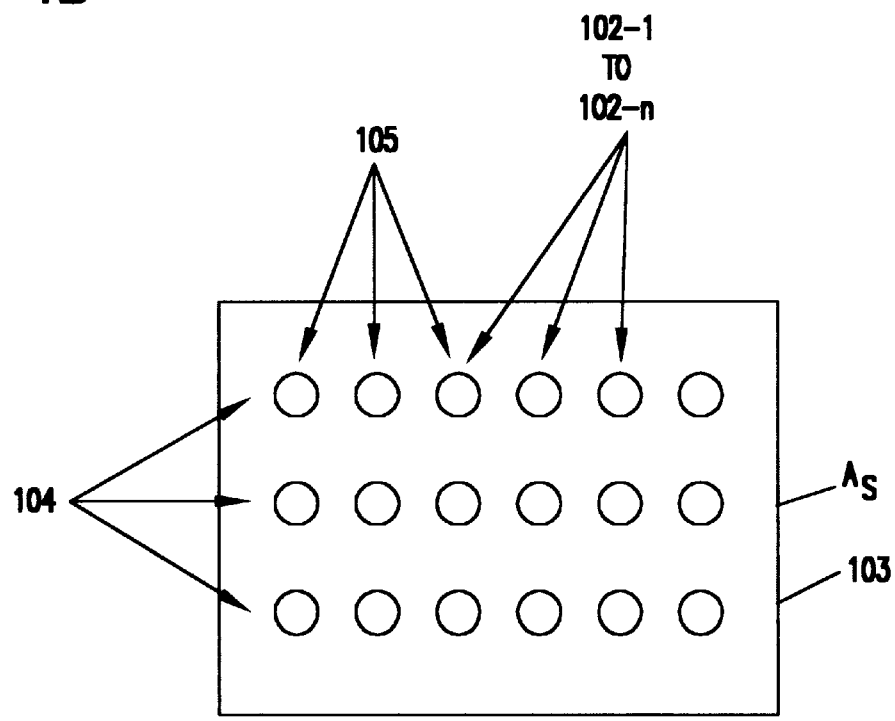
FIG. 4B is a detailed view of another embodiment of portion 4 in FIG. 3.
Figure 5:
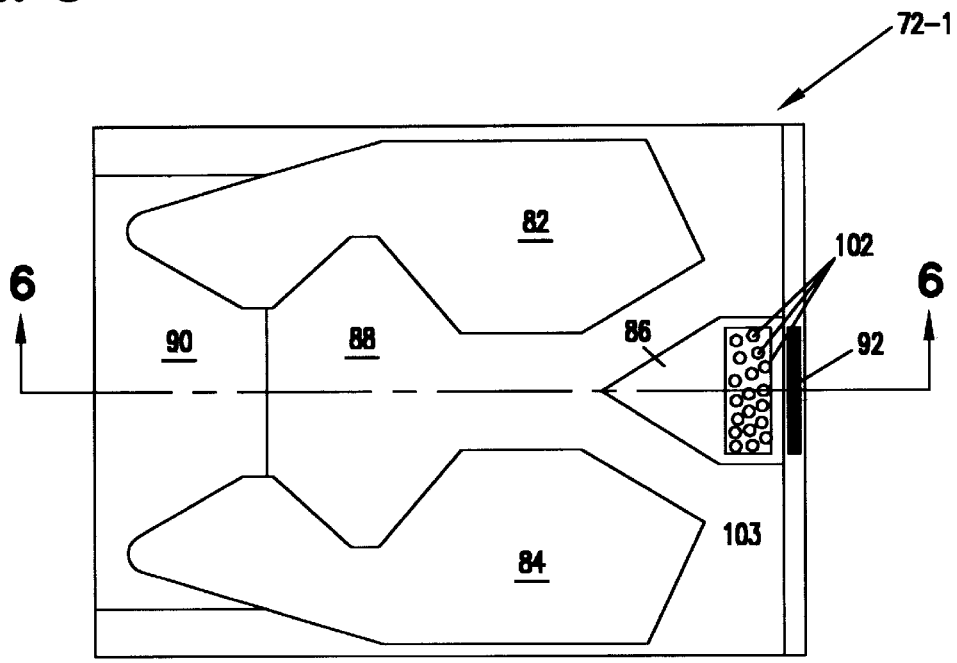
FIG. 5 is a plan view of a bearing surface of the slider illustrated in FIG. 3.

During operation, the slider intermittently contacts the disc surface, which might loosen material from the disc surface. A textured disc surface provides collection sites for the loosed debris, however debris piles or floats on relatively smooth disc surfaces, which are particularly advantageous for MR heads due to thermal asperities. Loosened debris may pile or float on a smooth disc surface causing thermal asperities which may corrupt written data on the disc. In the slider 72-1 of the present invention, the slider 72-1 includes a debris collection system for collecting debris to limit interference with operation of the disc drive. One embodiment of a debris collection system is illustrated in FIGS. 3–6. As shown, the slider 72-1 includes a plurality of spaced debris collection cavities 102-1 through 102-n, dispersed on the bearing 76. The debris collection cavities form a debris collection site 103 located proximate to an interface between the slider and disc surface as will be explained. The debris collection cavities 102 may be randomly dispersed as illustrated in FIG. 4A or organized in predefined rows and columns 104, 105 as illustrated in FIG. 4B.

The debris collection cavities 102-1 through 102-n are designed to provide a suction force so that loosened debris from the disc surface will be forced into the cavities for collection away from the disc surface to limit interference with operation and prevent formation of thermal asperities. The depth and the perimeter dimensions of the debris cavities 102 are sized to provide sufficient volume space to collect debris generated via slider 72-1 contact with the disc surface 54. The depth of cavities 102 is designed to create a negative suction force to enhance debris collection so that debris migrates to and is sucked into the cavities 102.

Preferably, the depth of the cavities 102 is approximately 2.0 $\mu$m, depending upon the number and size of the cavities 102 formed on the slider 72-1. The depth of the cavities 102 may be nonuniform and varied to enhance debris collection. Cavities 102 may be formed of any number of shapes and geometries, and the invention is not limited to any particular shape or geometry. As shown in FIGS. 4A–4B in one embodiment, the debris cavities may be round having an diameter of 3–4 $\mu$m. Alternatively the debris cavities may be square shaped having an area of 5×5 $\mu m^2$. The area $A_s$ of the debris collection site 103 is approximately 100 $\mu$m×100 $\mu$m.

The number of cavities and size of the cavities is designed to accommodate the debris collected. For example, a slider 72-1 may include five (5) debris collection cavities. The cavities may have an area of 5×5 $\mu m^2$ and a depth of 2 $\mu$m. In such an embodiment, if contact interface between the slider and disc surface generates 250 $\mu m^3$ of debris for a 100×100 $\mu m^2$ contact interface area with 25 nm penetration, five cavities of 5×5 $\mu m^2$ having a depth of 2 $\mu$m would be designed to collect the debris generated by the contact interface.

FIG. 7 illustrates a prior art slider 72 flying at a pitch angle $\theta_1$ relative to the disc surface 54 for proximity recording. As shown, slider 72 supports transducer 92 at the trailing edge a distance $h_T$ above the disc surface. During operation, head intermittently contacts asperities 104 on the disc surface. Contact of an MR head and an asperity 104 may cause thermal asperities degrading read operations from the disc surface.

Figure 8:
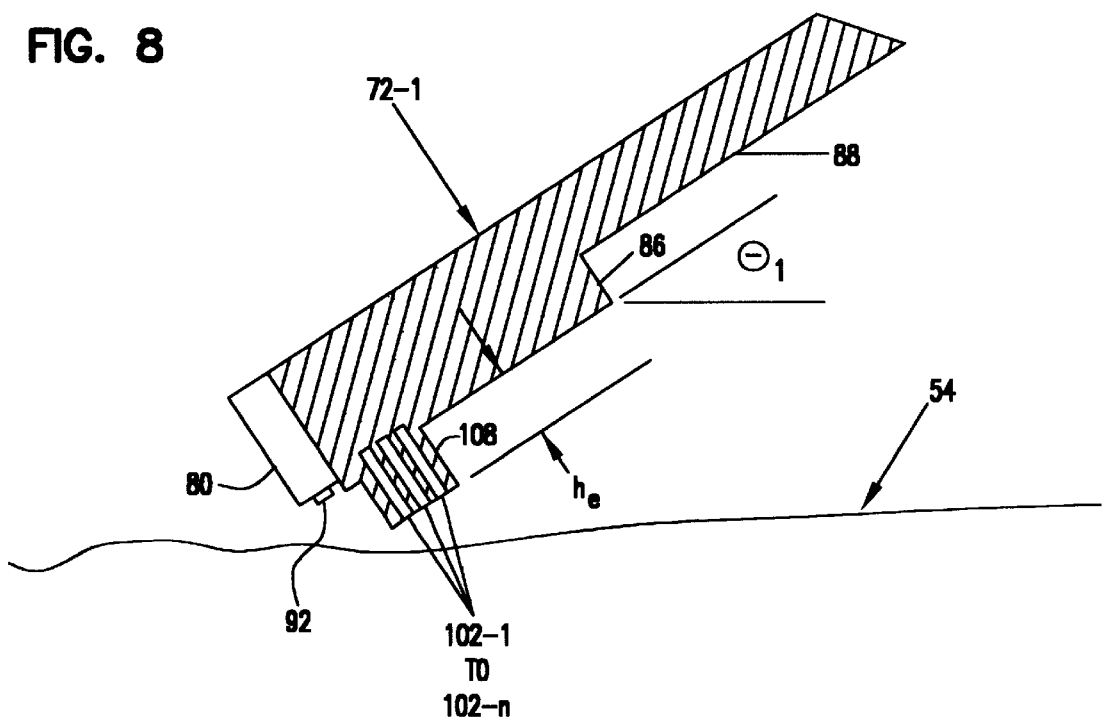
FIG. 8 is a cross-sectional view of a portion of the slider of FIG. 5 flying at a pitch angle relative to the disc surface.
Figure 6:
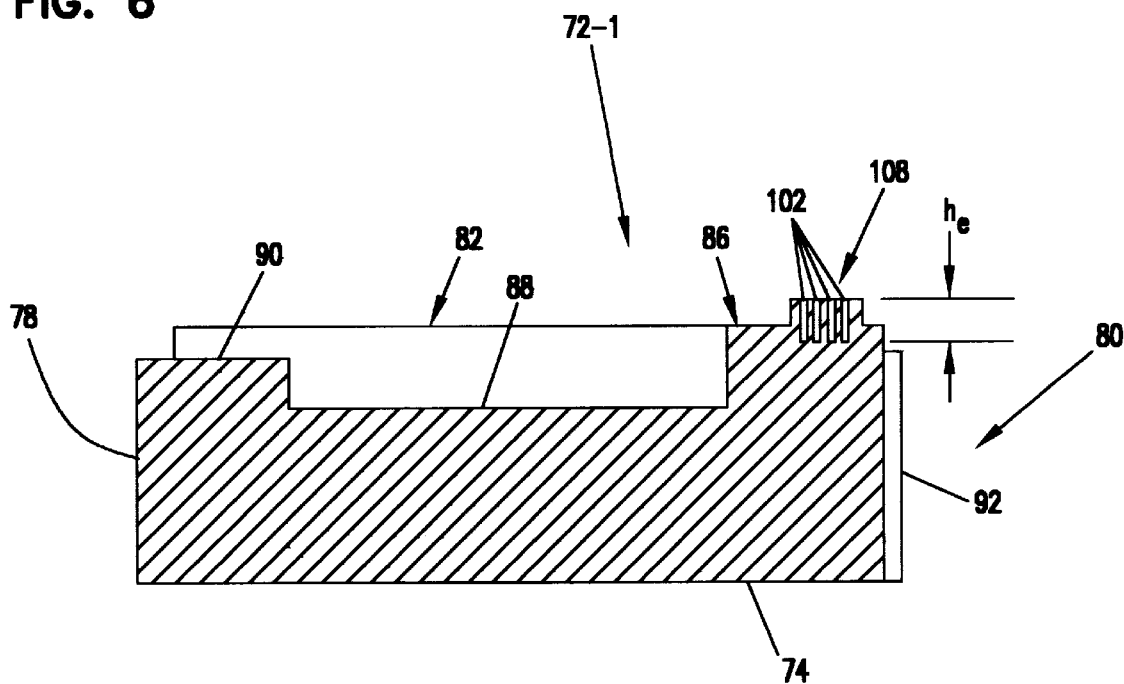
FIG. 6 is a cross-sectional view taken along line 6—6 of FIG. 5.

Debris collection cavities 102 are preferably formed at a contact interface location between the slider and the disc surface. FIG. 8 illustrates a trailing edge 80 portion of slider 72-1 flying at a pitch angle $\theta_1$ relative to the disc surface 54. In the embodiment of the slider 72-1, cavities 102 are formed on a contact extension 108 extending from center rail 86, as illustrated in FIG. 8, spaced from the transducer. Contact extension 108 is positioned on and is elevated from center rail 86 to provide a contact interface or close point between the slider and disc surface. A dispersed pattern of cavities 102-1 to 102-n is formed in extension 108 and extend therethrough to the slider substrate to provide desired depth for capturing wear debris.

During operation, as illustrated in FIG. 9, the contact extension 108 contacts the disc surface, since the contact extension 108 is the close point of the slider relative to the disc surface. Contact between the contact extension 108 and disc surface protects an MR transducer from thermal asperities. In particular, contact between the contact extension 108 and disc surface lowers the pitch angle to $\theta_2$ to shift the transducer elements from the disc surface to maintain the separation distance $h_T$ between the transducer and disc surface to reduce thermal asperities.

Slider air bearing surfaces 82, 84, 86 and 90 are formed by known etching and masking techniques to form bearing surfaces raised above base 88 of the slider substrate. Contact extension 108 may be formed on the substrate surface (preferably at center rail 86) by known deposit techniques. Cavities 102 may be formed in a desired dispersed pattern on the contact extension 108 via known etching and masking techniques, including ion milling, focus-ion-beam ("FIB") techniques, and chemical etching. Thus, as described, the cavities 102 collect floating debris which has been introduced via slider contact with the disc surface. Preferably, deposit extension 108 has a deposit thickness or height $h_e$ of 0.5–1.0 $\mu$inches.

Figure 10:
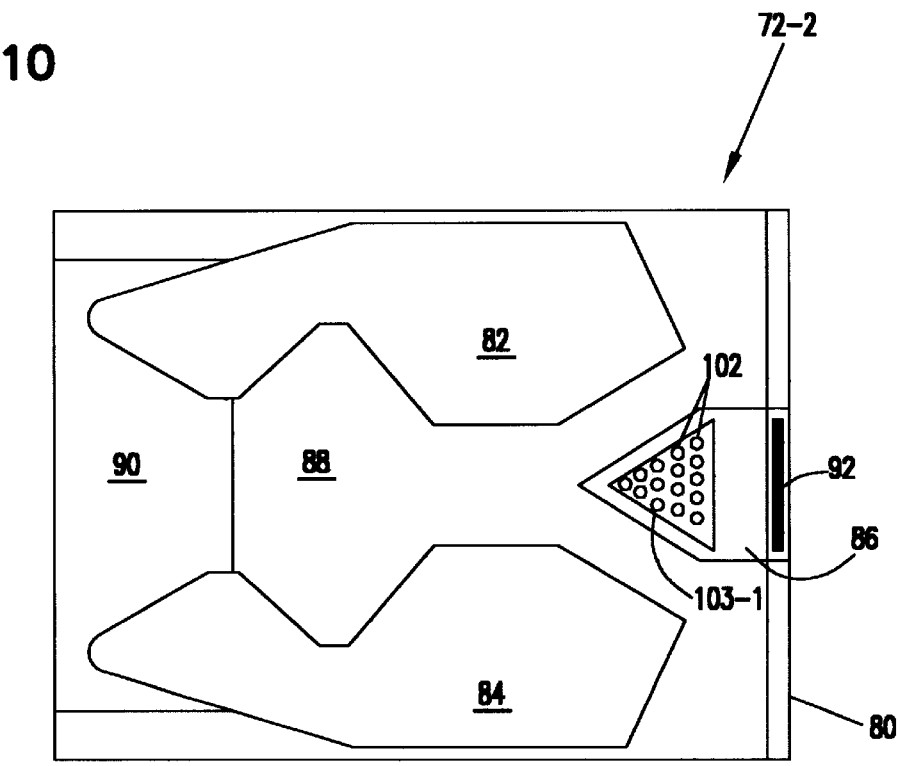
FIG. 10 is a plan view of an alternate embodiment of a slider including debris cavities.
Figure 11:
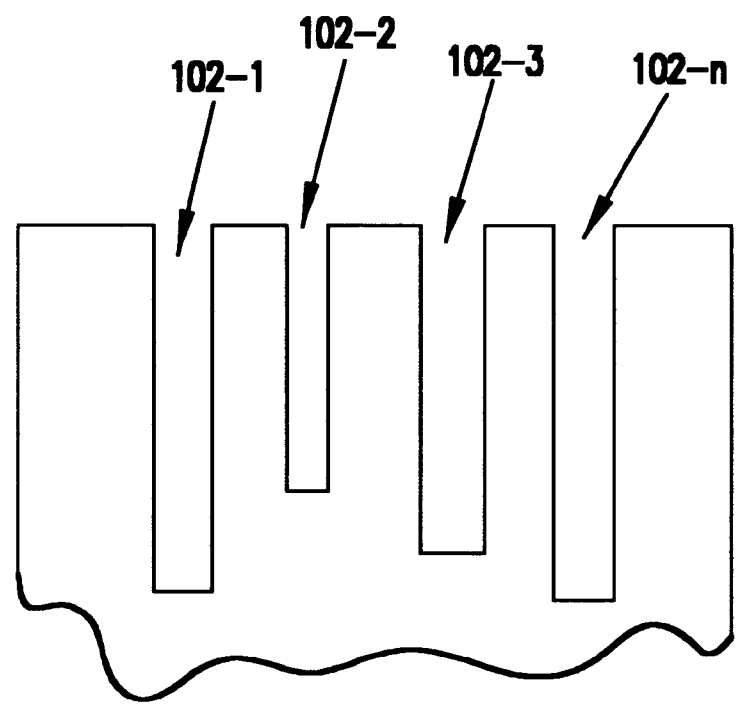
FIG. 11 is a detailed view of a portion of FIG. 9 illustrating an embodiment of the debris cavities having a non-uniform or varied depth dimension.

As previously explained, the debris collection sites of the present invention have particular application for magnetoresistive heads when flying above a relatively smooth disc surface for operation. Contact between the slider and a relatively smooth disc surface causes debris to loosen, which can pile or collect on the disc surface to degrade operation. The slider of the present invention includes cavities to collect scattered debris for operation. FIG. 10 is a plan view of an alternate slider 72-2 including a debris collection site 103-1 including debris collection cavities 102-1 to 102-n. As shown debris collection site 103-1 is slightly spaced from the trailing edge 80 and conforms to the shape of center rail 86. It should be understood that the debris cavities 102-1 to 102-n can be formed at alternate locations for forming a debris collection site at a contact interface between the slider and disc surface and formation is not limited to the exact embodiments shown.

Although the present invention has been described with reference to preferred embodiments, workers skilled in the art will recognize that changes may be made in form and detail without departing from the spirit and scope of the invention. In particular, although the present invention has been illustrated with respect to a disc drive with magnetically encoded, the invnetion is not limited to exact embodi-

What is claimed is:

1. A data storage system comprising:
a base;
a disc rotationally coupled to the base; and
a head operably coupled to the base and supported relative to a surface of the disc for operation of the data storage system, said head comprising:
at least one transducer element;
a slider including a leading edge and a trailing edge and opposed sides, the at least one transducer element being supported at the trailing edge, the slider including a bearing having at least one raised bearing surface and at least one recessed bearing surface facing the disc surface, said bearing including a plurality of relatively small debris cavities formed on the at least one raised bearing surface and the plurality of debris cavities being proximate to the trailing edge of the slider and the plurality of cavities including a plurality of debris cavities spaced along a longitudinal axis extending between the leading and trailing edges and a plurality of debris cavities spaced along a transverse axis extending between the opposed sides of the slider to collect debris generated by contact of the slider with the disc surface.

2. The data storage system of claim 1 wherein the plurality of debris cavities have a varied depth dimension to enhance debris collection.

3. The data storage system of claim 1 wherein the plurality of debris cavities have a depth of about 2 $\mu$m.

4. The data storage system of claim 1 wherein the at least one raised bearing surface includes a raised center pad and the plurality of debris cavities are formed on the raised center pad to form a debris collection site.

5. The data storage system of claim 1 wherein the at least one raised bearing surface includes at least five (5) debris cavities.

6. The data storage system of claim 1 wherein the slider includes a contact extension extending from a portion of the at least one raised bearing surface and the plurality of debris cavities are formed in the contact extension on the at least one raised bearing surface.

7. The data storage system of claim 1 wherein an area dimension of the plurality of debris cavities is about 25 square microns.

8. The data storage system of claim 1 wherein the plurality debris cavities are formed by a subtractive process.

9. The data storage system of claim 1 wherein the plurality of debris cavities spaced along the longitudinal axis and the plurality of debris cavities spaced along the transverse axis are formed on the at least one raised bearing surface in a random dispersed pattern to form a debris collection site.

10. The data storage system of claim 1 wherein the plurality of debris cavities spaced along the longitudinal axis and the plurality of debris cavities spaced along the transverse axis are formed on the at least one raised bearing surface in a predefined array pattern.

11. A slider adapted to support at least one transducer element for operation of a data storage system comprising:
a bearing including at least one raised bearing surface and at least one recessed bearing surface;
debris collection means on the at least one raised bearing surface for collecting debris generated by contact of the slider with a disc surface; and
wherein the debris collection means includes a plurality of relatively small debris cavities including a plurality of debris cavities spaced along a longitudinal axis between a leading edge and a trailing edge of the slider and a plurality of debris cavities spaced along a transverse axis extending between opposed sides of the slider and formed on the at least one raised bearing surface proximate to the trailing end of the slider.

12. The slider of claim 11 wherein the slider includes a contact extension extending from a portion of the at least one raised bearing surface and the plurality of debris cavities are formed in the contact extension.

13. The slider of claim 11 wherein the plurality of debris cavities each have a depth of about 2 $\mu$m.

14. The slider of claim 11 wherein the plurality of debris cavities are formed in a random dispersed pattern on the at least one raised bearing surface to form a debris collection site.

15. The slider of claim 11 wherein the plurality of debris cavities are formed in a predefined array pattern having rows and columns of debris cavities.

16. A method for fabricating a slider comprising the steps of:
forming at least one raised bearing surface and at least one recessed bearing surface on a slider substrate to define a bearing for operation of the slider; and
forming a plurality of relatively small debris cavities including a plurality of debris cavities spaced along a longitudinal axis between a leading edge and a trailing edge of the slider and a plurality of debris cavities spaced along a transverse axis extending between opposed sides of the slider on the at least one raised bearing surface at a contact interface for the slider and a disc surface.

17. The method of claim 16 wherein the at least one raised bearing surface and the at least one recessed bearing surface are formed by an etching process.

18. The method of claim 16 including the step of forming a contact extension on a portion of the at least one raised bearing surface proximate to the contact interface and forming the plurality of debris cavities in the contact extension.

19. The method of claim 18 wherein the contact extension is formed by a deposition process.

* * * * *